US008837899B2

(12) United States Patent
Fujii

(10) Patent No.: US 8,837,899 B2
(45) Date of Patent: Sep. 16, 2014

(54) IMAGE RECORDING APPARATUS AND IMAGE PLAYBACK APPARATUS

(75) Inventor: Akio Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 12/547,113

(22) Filed: Aug. 25, 2009

(65) Prior Publication Data
US 2010/0054714 A1 Mar. 4, 2010

(30) Foreign Application Priority Data

Aug. 28, 2008 (JP) ................................ 2008-219586

(51) Int. Cl.
| H04N 5/931 | (2006.01) |
| H04N 5/932 | (2006.01) |
| H04N 5/935 | (2006.01) |
| H04N 5/77 | (2006.01) |
| H04N 9/80 | (2006.01) |
| G11B 27/00 | (2006.01) |
| H04N 5/228 | (2006.01) |
| H04N 5/235 | (2006.01) |
| G03B 7/00 | (2006.01) |

(52) U.S. Cl.
CPC .................................. G11B 27/005 (2013.01)
USPC ........... 386/209; 386/210; 386/224; 386/225; 386/242; 348/208.12; 348/221.1; 348/229.1; 348/362

(58) Field of Classification Search
USPC ..................... 348/208.12, 221.1, 229.1, 362; 386/209, 210, 224, 225, 242
See application file for complete search history.

(56) References Cited

U.S. PATENT DOCUMENTS

| 6,341,168 | B1* | 1/2002 | Nagasaka et al. ............. 382/107 |
| 7,110,025 | B1* | 9/2006 | Loui et al. ................... 348/220.1 |
| 8,004,594 | B2* | 8/2011 | Oyama et al. ............. 348/333.05 |
| 2002/0178450 | A1* | 11/2002 | Morita et al. .................... 725/61 |
| 2007/0041707 | A1* | 2/2007 | Edmunds et al. ................ 386/95 |
| 2007/0076255 | A1* | 4/2007 | Hamashima et al. ......... 358/1.16 |
| 2007/0192211 | A1* | 8/2007 | Toshikage et al. .............. 705/26 |
| 2007/0195182 | A1* | 8/2007 | Ito ................................. 348/308 |

FOREIGN PATENT DOCUMENTS

| JP | 2004-080376 | 3/2004 |
| JP | 2005-012695 A | 1/2005 |

OTHER PUBLICATIONS

The above reference was cited in a Jan. 22, 2013 Japanese Office Action, which is enclosed without an English Translation, that issued in Japanese Patent Application No. 2008-219586.

* cited by examiner

Primary Examiner — Daquan Zhao
(74) Attorney, Agent, or Firm — Cowan, Liebowitz & Latman, P.C.

(57) ABSTRACT

An image recording playback apparatus which, when recording moving image data, performs image capture at high-speed read time Dt, records all the captured images, and records a playback rate Ft (Vt), the read time Dt and image valid time St, with the image data, on a recording medium. Then upon playback of moving image data, the image recording playback apparatus plays back the recorded image data within the image valid time St in accordance with the playback rate. The image recording playback apparatus having this configuration can perform playback intended by a user. Further, when sharpness is to be changed, a playback image with different sharpness can be obtained by changing the image valid time St upon playback.

14 Claims, 8 Drawing Sheets

| | |
|---|---|
| READ TIME | Dt |
| FRAME RATE | Ft |
| FIELD RATE | Vt |
| IMAGE VALID PERIOD | St |
| P(0) | 0 |
| FRAME 1 | address 1 |
| FRAME 2 | address 2 |
| ⋮ | ⋮ |
| Pq(0) | address j |
| ⋮ | ⋮ |
| P(1) | address k |
| ⋮ | ⋮ |
| FRAME N | address N |

| READING TIME | Dt |
| --- | --- |
| IMAGE CAPTURE POINT | Pt |
| IMAGE CAPTURE TIME | Rt |
| IMAGE VALID PERIOD | Ct |
| S(0) | 0 |
| S(1) | address S1 |
| FRAME 1 | address 1 |
| FRAME 2 | address 2 |
| ⋮ | ⋮ |
| S(1) | address S1 |
| ⋮ | ⋮ |
| FRAME M | address M |

(NUMBER OF FRAMES Gp)

(NUMBER OF FRAMES Gps)

IMAGE RECORDING APPARATUS AND IMAGE PLAYBACK APPARATUS

BACKGROUND OF THE INVENTION

1. Field of the Invention

The present invention relates to an image recording apparatus for capturing an image and recording image data of the image on a recording medium, and an image playback apparatus for playing back the image data recorded on the recording medium and outputting the played back image data.

2. Description of the Related Art

In recent years, some digital video cameras and digital cameras are capable of capturing both moving and still images. Such digital video camera and digital camera have a moving image capture mode/still image capture mode. When a moving image is to be captured, the camera main body is set to the moving image capture mode to capture the moving image, while when a still image is to be captured, the camera main body is set to the still image capture mode to capture the still image.

For example, when a still image is to be captured, bracket capturing is performed. Bracket capturing means capturing a still image in a plurality of exposure conditions based on one image capture instruction, recording captured image data on a recording medium, and selecting one image data closest to a user's desired image from the plural captured images.

Further, proposed is a technique of, in moving image capture, preparing m types (m is an integer greater than or equal to 2) of exposure conditions, performing capturing while changing the m types of exposure conditions by one frame at a frame rate of m×n (n is an integer greater than or equal to 2) per 1 second, then, upon playback, playing back frames on the same exposure condition at a frame rate of n frames per 1 second (see Japanese Patent Laid-Open No. 2004-80376).

However, in the above-described conventional image recording apparatuses and image playback apparatuses, an image on a changed exposure condition can be obtained upon playback, however, image sharpness (a blurring level and/or perceived resolution) cannot be selected.

For example, in a sporting event, when image capture is performed in a moving image or a still image mode and a desired scene is blurred upon playback, the sharpness cannot be changed, much less re-captured.

SUMMARY OF THE INVENTION

The present invention provides an image recording apparatus and an image playback apparatus which enable a user to perform playback with sharpness intended by the user when recording, and even when a playback image is blurred due to insufficient resolution, to change the sharpness when recording after the capture and performing playback.

According to a first aspect of the present invention, there is provided an image recording apparatus for capturing a moving image and recording image data of the moving image on a recording medium, comprising: an image capture unit to capture a moving image; a reading unit to read image data by frame from the image capture unit; a read time setting unit to set read time for reading the image data by the reading unit; an image valid time setting unit to set image valid time indicating a period for capturing a valid image within one frame period based on a playback rate upon playback of the image data; and a recording unit to record information indicating the read time and the image valid time, with the image data continuously read by the reading unit by the set read time, on the recording medium.

Further, according to a second aspect of the present invention, there is provided an image playback apparatus for playing back image data recorded on a recording medium and outputting the played back image data as a moving image, comprising: a playback unit to play back image data recorded on the recording medium by frame; a read time setting unit to read information indicating read time for image data played back by the frame from the recording medium and sets the read time; a playback rate setting unit to set a playback rate; an image valid time setting unit to read information regarding image valid time indicating a period for capturing a valid image within one frame period based on the playback rate from the recording medium and set the read information; and an image composition unit to compose image data for the number of frames corresponding to the set image valid time by the set playback rate, wherein the composed image data is output as the moving image.

Further, according to a third aspect of the image recording apparatus, there is provided an image recording apparatus for capturing a still image and recording image data of the still image on a recording medium, comprising: an image capture unit to capture a still image; a reading unit to read image data by frame from the image capture unit; a read time setting unit to set read time for reading the image data by the reading unit; an image valid time setting unit to set image valid time indicating a period for reading the still image; a capture time setting unit to set recording time for recording the image data on the recording medium; a capture point setting unit to set a capture point as a time point from which still image capture is started; and a recording unit to record information indicating the read time, the image valid time, the recording time and the capture point, with the image data continuously read by the reading unit by the set read time, on the recording medium.

Further, according to a fourth aspect of the present invention, there is provided an image playback apparatus for playing back image data recorded on a recording medium and outputting the played back image data as a still image, comprising: a playback unit to playback the image data recorded on the recording medium by frame; a read time setting unit to read information indicating read time for the image data played back by the frame from the recording medium and set the read information; an image valid time setting unit to read information regarding image valid time indicating a period for reading a still image from the recording medium and set the read information; a recording time setting unit to read information indicating recording time of the played back image data from the recording medium and set the read information; a capture point setting unit to read information indicating a capture point as a time point of start of still image capture from the recording medium and set the read information; and an image composition unit to compose image data for the number of frames corresponding to the set image valid time from the set capture point, wherein the composed image data is output as the still image.

Further features of the present invention will become apparent from the following description of exemplary embodiments with reference to the attached drawings.

DESCRIPTION OF THE EMBODIMENTS

Embodiments of an image recording apparatus and an image playback apparatus according to the present invention will be described in accordance with the accompanying drawings. The image recording apparatus and the image playback apparatus in the embodiments are applied to an image recording playback apparatus.

[First Embodiment]

Figure 1:
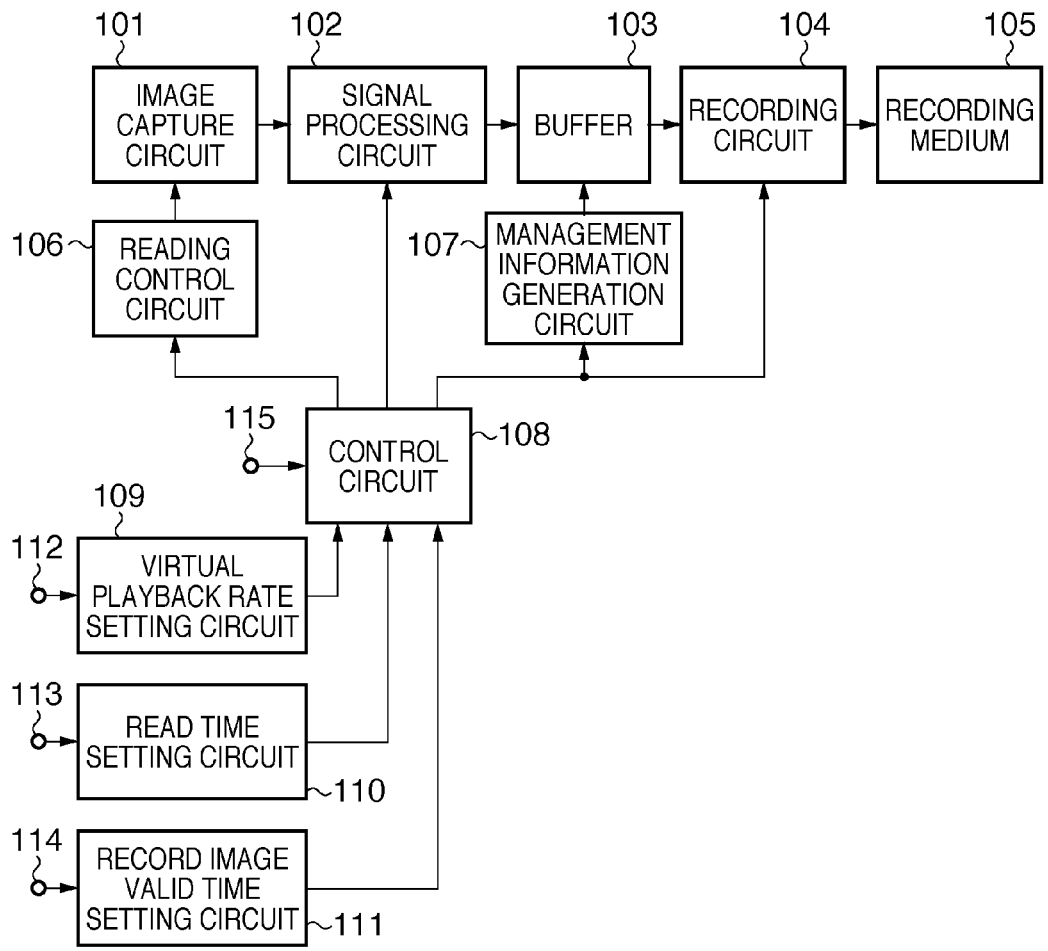
FIG. 1 is a block diagram showing a configuration of an image recording circuit in an image recording playback apparatus in a first embodiment of the present invention.

In a first embodiment, recording and playback of moving image data will be described. First, recording of moving image data will be described. FIG. 1 is a block diagram showing a configuration of an image recording circuit in an image recording playback apparatus in the first embodiment. As the image recording playback apparatus, a digital video camera or the like can be given.

The image recording circuit has an image capture circuit 101, a signal processing circuit 102, a buffer 103, a recording circuit 104, a recording medium 105, a reading control circuit 106, a management information generation circuit 107 and a control circuit 108. Further, the image recording circuit has a virtual playback rate setting circuit 109, a read time setting circuit 110, a record image valid time setting circuit 111 and input terminals 112 to 115.

The image capture circuit 101, having an image capture device and a captured image reading unit, captures a moving image with the image capture device, reads image data by frame at set read time by the reading unit, and outputs the image data to the signal processing circuit 102. The signal processing circuit 102 performs image compression or the like in accordance with necessity, in addition to camera signal processing. The buffer 103 temporarily holds (buffers) the image data output from the signal processing circuit 102. The recording circuit 104 records the image data from the signal processing circuit 102 on the recording medium 105. The image data is recorded on the recording medium 105.

The reading control circuit 106 controls the image capture circuit 101. The management information generation circuit 107 generates management information for the image data recorded on the recording medium 105. The virtual playback rate setting circuit 109 sets a playback rate upon playback. The read time setting circuit 110 sets image data read time in the image capture circuit 101. The record image valid time setting circuit 111 sets image valid time indicating a period of valid image capture within one frame period based on the playback rate.

Figure 2:
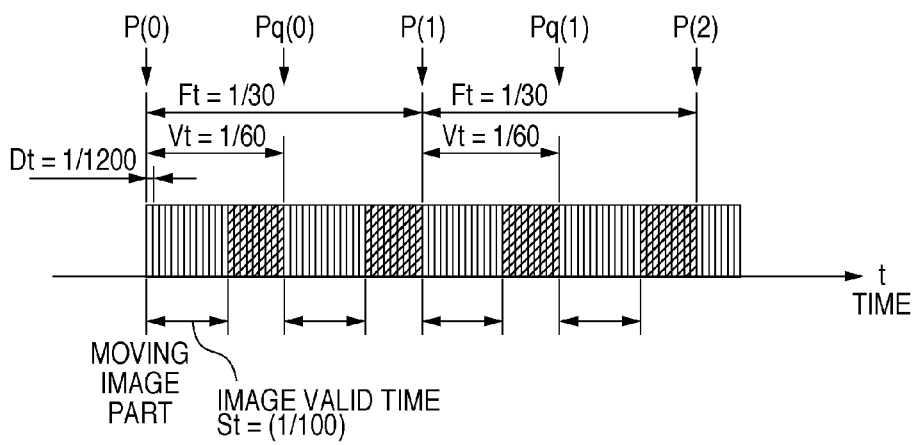
FIG. 2 is a timing chart showing an image data recording operation.

The recording operation of the image recording circuit having the above-described configuration will be described. FIG. 2 is a timing chart showing an image data recording operation. The read time setting circuit 110 sets read time Dt ($1/1200$ sec in FIG. 2) for reading frame images from the image capture device in the control circuit 108.

The virtual playback rate setting circuit 109 sets a frame rate Ft (sec) as a subject of playback in the control circuit 108. In FIG. 2, the frame rate Ft is set such that the frame rate Ft=$1/30$ sec and a field rate Vt=$1/60$ sec hold.

The record image valid time setting circuit 111 sets image valid time St (St=$1/100$ sec in FIG. 2), by the user's setting, system mode (Tv mode or the like) setting or the like, in the control circuit 108.

The control circuit 108 sets the read time Dt set by the read time setting circuit 110 in the reading control circuit 106. The reading control circuit 106 drives the image capture circuit 101 at the read time Dt ($1/1200$ sec in FIG. 2) as a frame image read time, and outputs captured image data from the image capture circuit 101.

The signal processing circuit 102 performs camera signal processing such as color extraction and γ correction on the captured image data output from the image capture circuit 101, and outputs the processed data as image data.

When the user operates a user interface (not shown) to instruct to start recording, the instruction signal is input from the input terminal 115 into the control circuit 108. The control circuit 108 notifies the respective blocks of recording start timing P(0) (see FIG. 2). The signal processing circuit 102 performs image compression on the image data subjected to the camera signal processing, in accordance with necessity, and supplies the processed image data to the buffer 103.

Further, the control circuit 108 supplies recording timings Pq(0), P(1), Pq(1), P(2), . . . , to the management information generation circuit 107 in accordance with the frame rate Ft (field rate Vt) as a playback rate set in the virtual playback rate setting circuit 109.

Further, the control circuit 108 supplies the image valid time St supplied from the record image valid time setting circuit 111 to the management information generation circuit 107.

The management information generation circuit 107 adds flags to the recording timings Pq(0), P(1), Pq1(1), P(2), . . . , supplied from the control circuit 108, in correspondence with respective frame image data. Further, the management information generation circuit 107 adds the management information such as the read time D1, the frame rate Ft (field rate Vt) and the image valid time St to the respective frame image data, and multiplexes with the image data temporarily stored (buffered) in the buffer 103.

The image data multiplexed with the management information is supplied from the buffer 103 to the recording circuit 104. The recording circuit 104 performs error correction processing, modulation or the like necessary for recording on the recording medium 105, and records the processed image data on the recording medium 105.

Figures 3, 4:
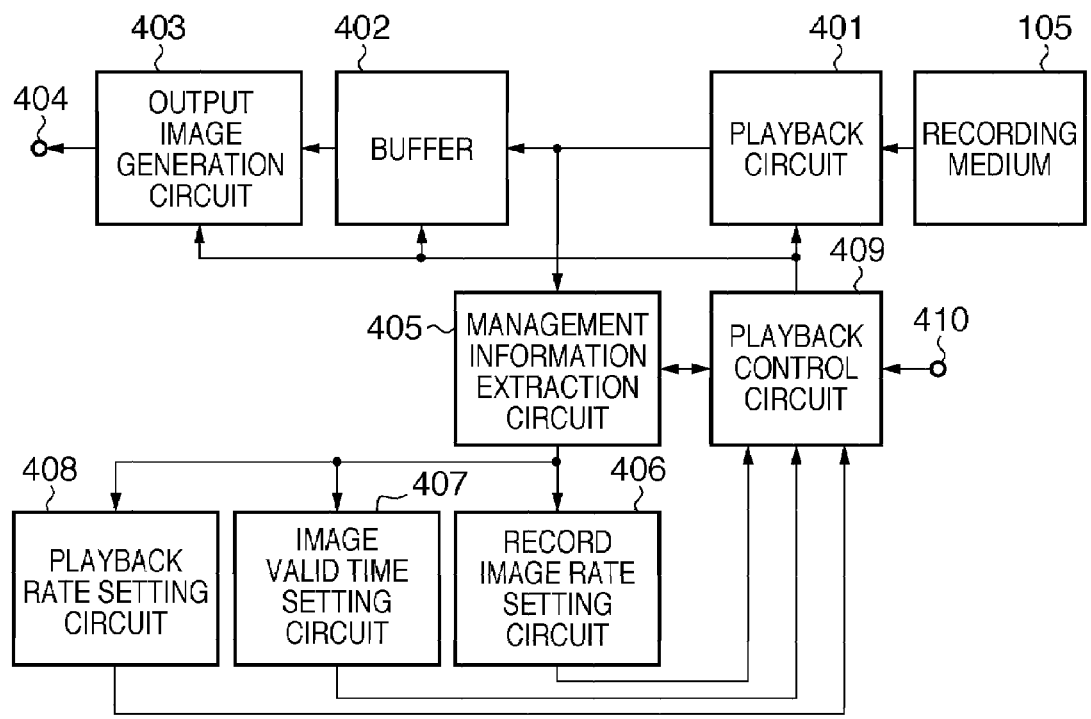
FIG. 3 is a table showing management information data.
FIG. 4 is a block diagram showing a configuration of an image playback circuit in the image recording playback apparatus.

As shown in FIG. 3, the management information generation circuit 107 generates offset addresses from the recording start timing P(0), for the respective frame image data recorded on the recording medium 105 via the recording circuit 104. The management information generation circuit 107 generates management information data by adding information regarding the read time Dt from the image capture circuit 101, the frame rate Ft as the subject of playback, the field rate Vt, and the image valid time St to the offset addresses. When no image data is recorded on the recording medium 105, the management information generation circuit 107 records the management information data on the recording medium 105 via the buffer 103 and the recording circuit 104.

FIG. 3 is a table showing the management information data. The table shows the read time Dt, the frame rate Ft, the field rate Vt, the image valid time St, and the recording timings Pq(0), P(1), . . . . Further, the table shows offset addresses (addresses 1, 2, . . . , N) from the recording start timing P(0) by each frame image data. Note that as described above, the management information data may be added to image data and recorded, or may be recorded as a file different from image data.

Further, in the image recording circuit, as well as the image valid time St, the setting of the read time Dt can be changed, however, it is necessary to satisfy at least the relation of the following expression (1).

$$Dt < St \qquad (1)$$

Further, the settings of the frame rate Ft and the field rate Vt can be also changed. For example, the settings may be changed as Ft=1/25 sec, Vt=1/50 sec, or Ft=1/60 sec, Vt=1/60 sec.

Next, playback of moving image data recorded on the recording medium 105 will be described. FIG. 4 is a block diagram showing a configuration of an image playback circuit in the image recording playback apparatus. The image playback circuit plays back the image data recorded on the recording medium 105. The image playback circuit has a playback circuit 401, a buffer 402, an output image generation circuit 403, an output terminal 404 and a management information extraction circuit 405. Further, the image playback circuit has a record image rate setting circuit 406, an image valid time setting circuit 407, a playback rate setting circuit 408, a playback control circuit 409 and an input terminal 410.

As described above, the recording medium 105 holds image data and management information data. The playback circuit 401 plays back the image data recorded on the recording medium 105. The buffer 402 temporarily holds (buffers) the image data played back by the playback circuit 401. The output image generation circuit 403 (image composition unit) performs composition or the like on the image data output from the buffer 402 and outputs the data.

The management information extraction circuit 405 extracts the management information multiplexed with the image data output from the playback circuit 401 and holds the extracted information. The record image rate setting circuit 406 sets a frame rate when recording the image data recorded on the recording medium 105 (read time Dt) in the playback control circuit 409 in accordance with the information from the management information extraction circuit 405. The image valid time setting circuit 407 sets the image valid time St in the playback control circuit 409 in accordance with the information from the management information extraction circuit 405.

The playback rate setting circuit 408 sets the playback rate in the playback control circuit 409 in accordance with the information from the management information extraction circuit 405. The playback control circuit 409 controls the respective blocks, that is, the playback circuit 401, the buffer 402, the output image generation circuit 403 and the like, in accordance with set parameters, to generate a playback image. The input terminal 410 inputs parameters such as playback condition into the playback control circuit 409.

Next, a playback operation of the image playback circuit having the above-described configuration will be described. Upon playback, the playback control circuit 409 controls the playback circuit 401, to read the management information data recorded on the recording medium 105, and supply the read management information data via the playback circuit 401 to the management information extraction circuit 405. The management information extraction circuit 405 holds the supplied management information data, extracts the read time Dt (1/1200 sec in FIG. 2) recorded during recording, and supplies the extracted read time Dt to the record image rate setting circuit 406.

Further, the management information extraction circuit 405 supplies the image valid time St (St=1/100 sec in FIG. 2) to the image valid time setting circuit 407. Further, the management information extraction circuit 405 supplies the playback rate (Ft=1/30 sec and Vt=1/60 sec in FIG. 2) to the playback rate setting circuit 408.

When the reading of the management information data has been completed, the playback control circuit 409 controls the playback circuit 401. That is, the playback control circuit 409 starts playback of the image data recorded on the recording medium 105 based on the management information stored in the management information extraction circuit 405, from a frame at the recording start timing P(0). For example, in FIG. 3, the playback is started based on "0" at the address ("address") recorded as the recording start timing P(0). FIGS. 5A to 5E are timing charts showing the image data reading from the recording medium upon playback.

Figure 5A:
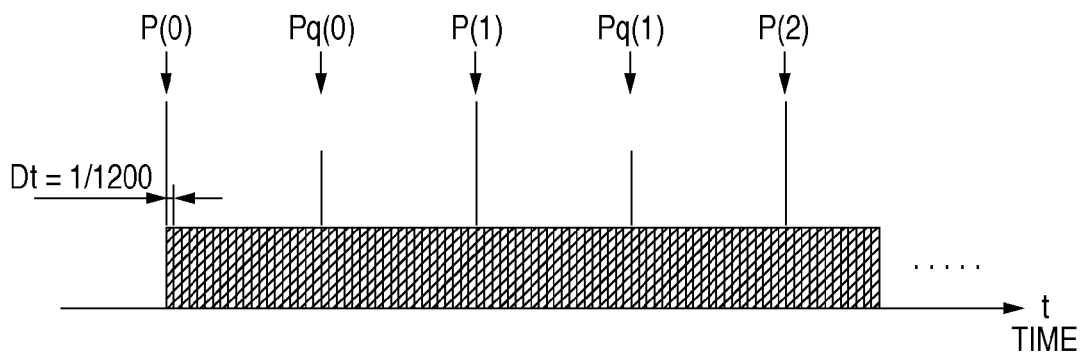
FIGS. 5A to 5E are timing charts showing image data reading from a recording medium upon playback.

Upon playback, the playback control circuit 409 controls the playback circuit 401 based on the read time Dt set in the record image rate setting circuit 406. That is, as shown in FIG. 5A, the playback circuit 401 reads one frame of image data from the recording medium 105 at a rate at least in the read time Dt, and supplies the image data to the buffer 402.

Further, the playback control circuit 409 calculates the number of frames Fp (the number of frames corresponding to the image valid time) in accordance with the following expression (2), based on the image valid time St set in the image valid time setting circuit 407 and a record image rate value (read time Dt).

$$Fp = St/Dt \qquad (2)$$

Figure 5B:
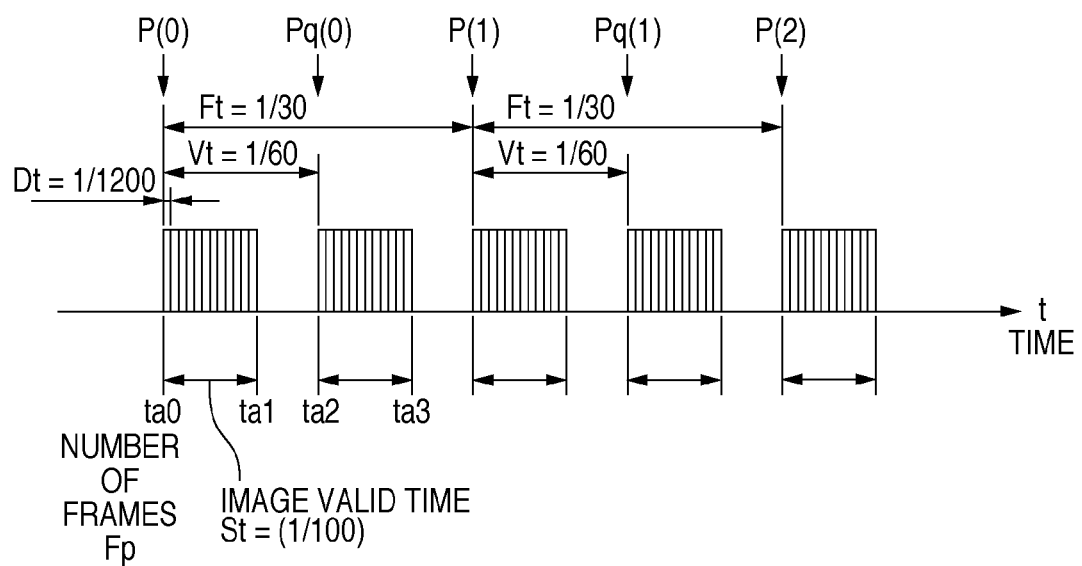

As shown in FIG. 5B, the playback control circuit 409 reads frames (frames in the section between "ta0" and "ta1") corresponding to the number of frames Fp calculated with the expression (2), among the playback frames played back from the recording start timing P(0), from the buffer 402. Then the playback control circuit 409 supplies the read frames to the output image generation circuit 403.

Figure 5C:
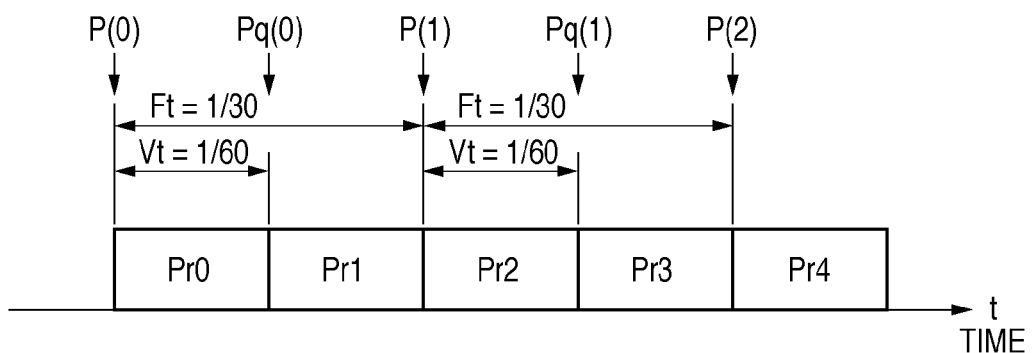

The output image generation circuit 403 composes the image data for the number of frames Fp supplied from the buffer 402, to generate one image Pr0. As shown in FIG. 5C, as a representative image at the playback rate Vt (sec) from the recording start timing P(0), the image Pr0 is output from the output terminal 404.

Similarly, as shown in FIG. 5B, at the recording timing Pq(0), image data for the number of frames Fp in the section between "ta2" and "ta3" is composed by the output image generation circuit 403. As shown in FIG. 5C, as a representative image at the playback rate Vt (sec) from the recording timing Pq(0), image data Pr1 is output from the output terminal 404. Similarly, image data Pr2 to Pr4 are output from the output terminal 404, and can be viewed on a monitor (not shown) connected to the output terminal 404.

Note that upon viewing on the monitor, when the playback image is blurred and the user wants to obtain a sharper image, that is, increase temporal resolution (resolution in time direction), the user can issue an instruction from a user interface (not shown) such as a menu, a key or the like. That is, an instruction to change the resolution in the time direction is input from the input terminal 410 to the playback control circuit 409. When the instruction to increase the resolution in the time direction has been issued, the playback control circuit 409 newly sets image valid time Sts for the image valid time setting circuit 407 (see FIG. 5D). The newly set image valid time Sts satisfies the relation in the following expression (3) with respect to the previously-set image valid time St, and is, for example, 1/200 sec.

Sts<St                                     (3)

The playback control circuit 409 calculates a new number of frames Fps in accordance with the following expression (4) based on the image valid time Sts set in the image valid time setting circuit 407 and the record image rate value (image read time Dt) set in the record image rate setting circuit 406.

Fps=Sts/Dt                                  (4)

The calculated new number of frames Fps satisfies the relation in the following expression (5) with respect to the previously-set number of frames Fp.

Fps<Fp                                      (5)

Figure 5D:
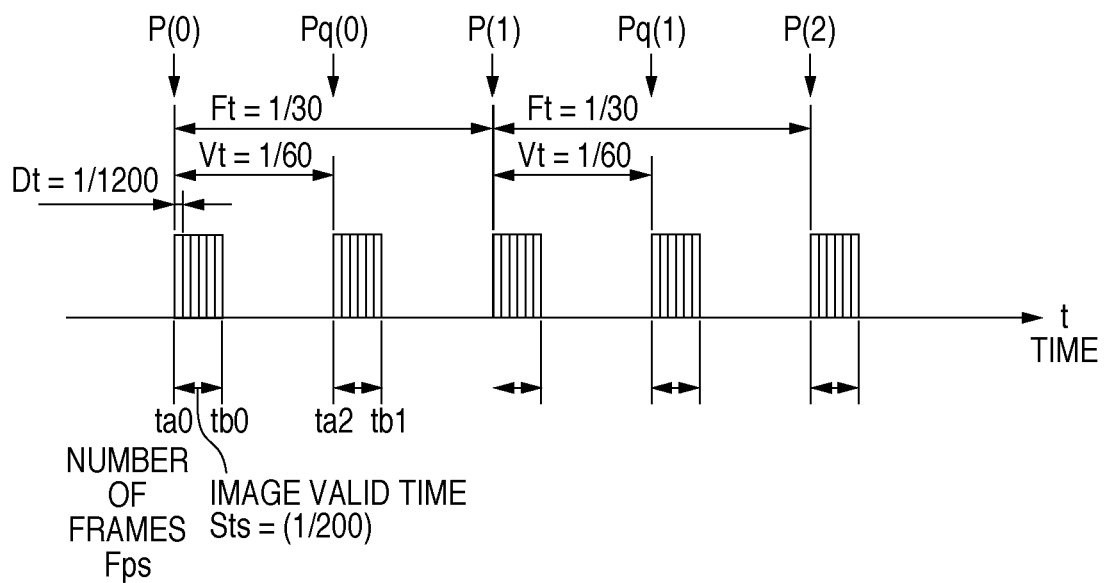

As shown in FIG. 5D, the playback control circuit 409 reads frames corresponding to the number of frames Fps calculated with the expression (4) among the playback frames played back from the recording start timing P(0) from the buffer 402, and supplies the read frames to the output image generation circuit 403. The frames corresponding to the number of frames Fps are frames in the section between "ta0" and "tb0" shown in FIG. 5D.

Figure 5E:
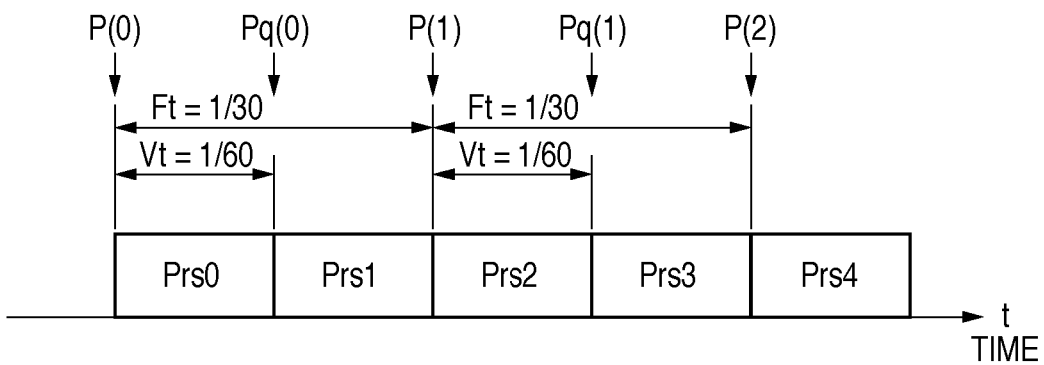

The output image generation circuit 403 composes the frames corresponding to the number of frames Fps supplied from the buffer 402 to generate one image data Prs0. As shown in FIG. 5E, as a representative image at the playback rate Vt from the recording start timing P(0), the image data Prs0 is output from the output terminal 404.

Similarly, as shown in FIG. 5D, at the recording timing Pq(0), frames corresponding to the number of frames Fps in the section between "ta2" and "tb1" are composed by the output image generation circuit 403. Then, as a representative image at the recording timing Pq(0), the image data Prs1 is output from the output terminal 404. Similarly, the image data Prs2, Prs3 and Prs4 are output, and can be viewed on the monitor (not shown) connected to the output terminal 404.

Thus the user can view an image with temporal higher resolution with reduced blur in comparison with the image data Pr0, Pr1, Pr2, Pr3, Pr4, . . . .

Further, by performing recording as described above, upon playback, the image recording playback apparatus generates a playback image using frames of recorded image data for the image valid time St, in correspondence with the playback rate Ft. At this time, when the playback image is blurred, a sharper image can be obtained by shortening the image valid time St and performing playback. On the other hand, to reduce a noisy feeling in a slow-moving image, it is possible to lengthen the image valid time St and perform playback.

When recording moving image data, the image recording playback apparatus in the first embodiment performs image capture at the high-speed read time Dt then records all the captured image, and records the playback rate Ft (Vt), the read time Dt and the image valid time St, with the image data, on the recording medium. Then, upon playback of the moving image data, the image recording playback apparatus plays back the recorded image data within the image valid time St in correspondence with the playback rate. This enables the user's intended playback. Further, to change the sharpness, a playback image with different sharpness can be obtained by changing the image valid time St upon playback.

In this manner, in the case of moving image capture, with image data continuously read by read time, the read time and the image valid time are recorded on the recording medium. By this arrangement, the user's intended image valid time (shutter speed) can be recorded as data. Then, the data is utilized during playback, thereby the moving image after the image capture in which the sharpness is changed can be viewed. That is, the image data can be played back with sharpness intended by the user at record time, and in addition, even when the playback image is blurred due to insufficient resolution, the sharpness at record time can be changed after the image capture and a moving image with modified sharpness can be played back. Further, during playback, the playback rate can be read from the recording medium and utilized. Further, the image data and its management information can be handled as one file. Further, the present invention is applicable to image data playback by interlaced scanning. Further, the read time can be arbitrarily set within a valid range. Further, during playback, the user's intended moving image playback can be performed by playing back recorded image data in the image valid time in correspondence with a playback rate. Further, the number of composed frames can be easily controlled. Further, a recorded playback image can be obtained with sharpness intended by the user upon image capture without setting operation upon playback. Further, the playback rate of the playback moving image can be changed. Further, when a playback moving image is blurred and the sharpness is to be changed, a sharper playback image can be obtained by changing the image valid time upon playback.

Note that in the present embodiment, the playback rate Ft (Vt), the read time Dt and the image valid time St are multiplexed with image data and recorded on the recording medium, however, these information may be recorded on the recording medium as metadata of the image data.

Further, it may be arranged such that the start frame position of image data composed by playback rate can be changed. In this arrangement, the scene in the playback moving image can be shifted.

[Second Embodiment]

Figure 6:
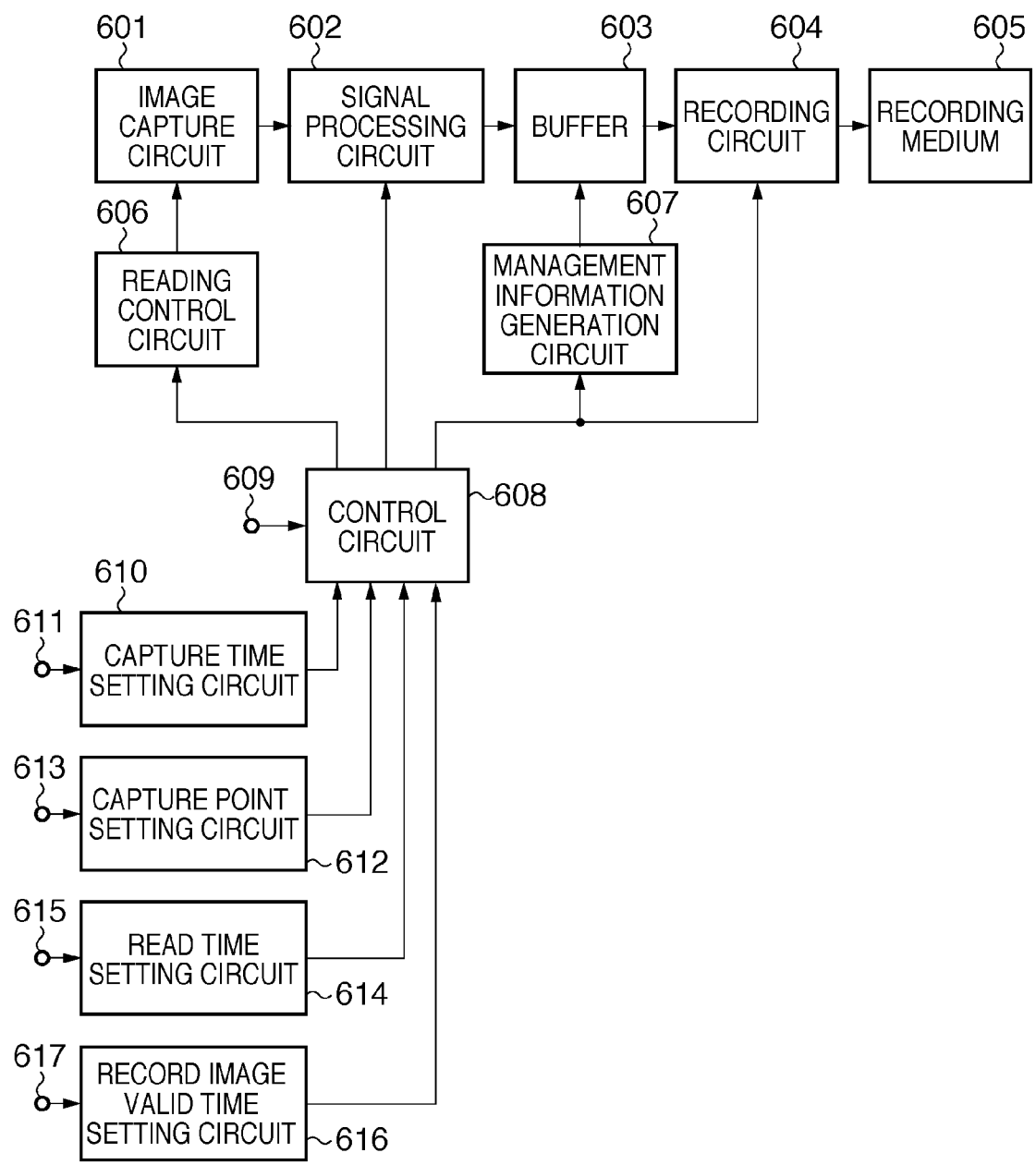
FIG. 6 is a block diagram showing the configuration of the image recording circuit in the image recording playback apparatus in a second embodiment of the present invention.

In the second embodiment, recording and playback of still image data will be described. First, recording of still image data will be described. FIG. 6 is a block diagram showing the configuration of the image recording circuit in the image recording playback apparatus in the second embodiment. As the image recording playback apparatus, a digital SLR (single lens reflex) camera can be given.

The image recording circuit has an image capture circuit 601, a signal processing circuit 602, a buffer 603, a recording circuit 604, a recording medium 605, a reading control circuit 606, a management information generation circuit 607 and a control circuit 608. Further, the image recording circuit has a capture time setting circuit 610, a capture point setting circuit 612, a read time setting circuit 614, a record image valid time setting circuit 616 and input terminals 609, 611, 613, 615 and 617.

The image capture circuit 601 has an image capture device and a captured image reading unit. The image capture circuit 601 captures a still image with the image capture device, reads frame image data indicating the captured still image with the reading unit by set read time, and outputs the read frame image data to the signal processing circuit 602. The signal processing circuit 602 performs image compression and the like in accordance with necessity, in addition to camera signal processing. The buffer 603 temporarily holds (buffers) the output from the signal processing circuit 602. The recording circuit 604 records the image data from the signal processing circuit 602 on the recording medium 605. The reading control circuit 606 controls the image capture circuit 601.

The management information generation circuit 607 generates management information of image data to be recorded. The input terminal 609 inputs a control parameter to the control circuit 608. The capture time setting circuit 610 sets capture time for image data recorded in one capture. The capture point setting circuit 612 sets a time indicating a point in time at which the user presses a shutter button to capture a still image (capture point) among image data recorded within the capture time set by the capture time setting circuit 610.

The read time setting circuit 614 sets image data read time in the image capture circuit 601. The record image valid time setting circuit 616 sets image valid time Ct indicating the period in which the user has pressed the shutter button to capture the still image. Further, the record image valid time setting circuit 616 sets the image valid time Ct in the control circuit 608 by the user's setting, mode setting of the system (Tv, Av, AUTO mode or the like) or the like.

Figures 7, 8:
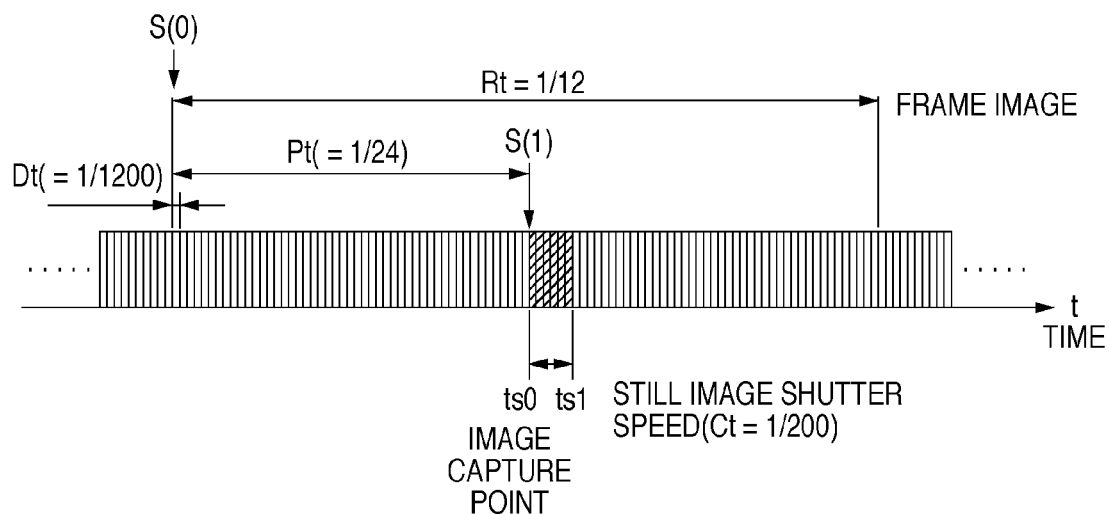
FIG. 7 is a timing chart showing the image data recording operation.
FIG. 8 is a table showing the management information data.

Next, a recording operation of the image recording circuit having the above-described configuration will be described. FIG. 7 is a timing chart showing the image data recording operation. In FIG. 7, the image valid time Ct is set such that image valid time Ct=$\frac{1}{200}$ sec holds. As shown in FIG. 7, the read time setting circuit 614 sets the read time Dt (sec) for reading frame images from the image capture device, in the control circuit 608. In FIG. 7, the read time Dt is set such that read time Dt=$\frac{1}{1200}$ sec holds.

As shown in FIG. 7, the capture time setting circuit 610 sets capture time Rt (sec) for image data recorded upon still image capture, in the control circuit 608. In FIG. 7, the capture time Rt is set such that capture time Rt=$\frac{1}{12}$ sec holds.

The capture point setting circuit 612 sets the capture point Pt indicating a point in time of start of recording, back from the point in time of still image capture (point S(1) in FIG. 7), upon the user's depression of the shutter button, in the control circuit 608. That is, the capture point Pt indicates a point of image data captured by the user as a still image from recorded image data. In FIG. 7, the capture point Pt is set such that Pt=$\frac{1}{24}$ sec holds. In this manner, upon start of image capture, image data back from the capture point by an offset time is recorded on the recording medium. Further, image data for time obtained by subtracting the offset time from the recording time is recorded on the recording medium.

The setting of the above-described parameters can be changed, however, it is necessary to satisfy at least the relation indicated by the following expression (6).

$$Dt \leq Ct < Rt \quad (6)$$

The control circuit 608 reads the read time Dt set in the read time setting circuit 614, and sets the read time Dt in the reading control circuit 606. The reading control circuit 606 drives the image capture circuit 601 at the read time Dt ($\frac{1}{1200}$ sec in FIG. 7), and outputs captured image data (image data) from the image capture circuit 601.

The signal processing circuit 602 performs camera signal processing such as color extraction, γ correction and the like on the captured image data output from the image capture circuit 601 and outputs the processed data as image data. Further, the signal processing circuit 602 performs image compression on the image data subjected to the camera signal processing in accordance with necessity, and supplies the compressed image data to the buffer 603. The buffer 603 holds the image data supplied from the signal processing circuit 602.

Note that when the user presses the shutter button (not shown) to capture a still image, a recording start instruction information is input from the input terminal 609 into the control circuit 608.

The control circuit 608 performs marking at a time point S(1) with respect to the image data read from the image capture circuit 601 at the timing of reception of the recording start instruction information. The control circuit 608 performs control such that the image data stored in the buffer 603 is recorded via the recording circuit 604 on the recording medium 605 from a time point S(0) back from the time point S(1) upon marking by the capture point Pt (Pt=$\frac{1}{24}$ sec in FIG. 7).

When the recording is started, the recording circuit 604 performs error correction processing, modulation and the like necessary for recording on the recording medium 605, and records the image data on the recording medium 605. The control circuit 608 supplies the capture point Pt, the capture time Rt, the read time Dt and the image valid time Ct to the management information generation circuit 607.

The management information generation circuit 607 generates management information data including the read time Dt, the capture point Pt, the capture time Rt, the image valid time Ct, and the like. FIG. 8 is a table showing the management information data. The management information generation circuit 607 generates an offset address at the capture time point S(1), address S1, and offset addresses for the respective frame image data, address 1, address 2, . . . . Then, the management information generation circuit 607 buffers these generated data as management information data in the buffer 603. Note that the offset address for the image data at the capture time point S(1), address S1, means an offset address for the recorded image data from the address at the recording start time point S(0).

When the recording of the image data has been completed in the recording time (capture time) Rt, the recording circuit 604 records the management information data as additional data for the series of image data.

Note that it may be arranged such that the recording circuit 604 stores the image data in the buffer 603 during the capture time Rt, then records the management information data on the recording medium 605, and then records the image data. Otherwise, it may be arranged such that the recording circuit 604 records the management information data as another file on the recording medium 605.

Figure 9:
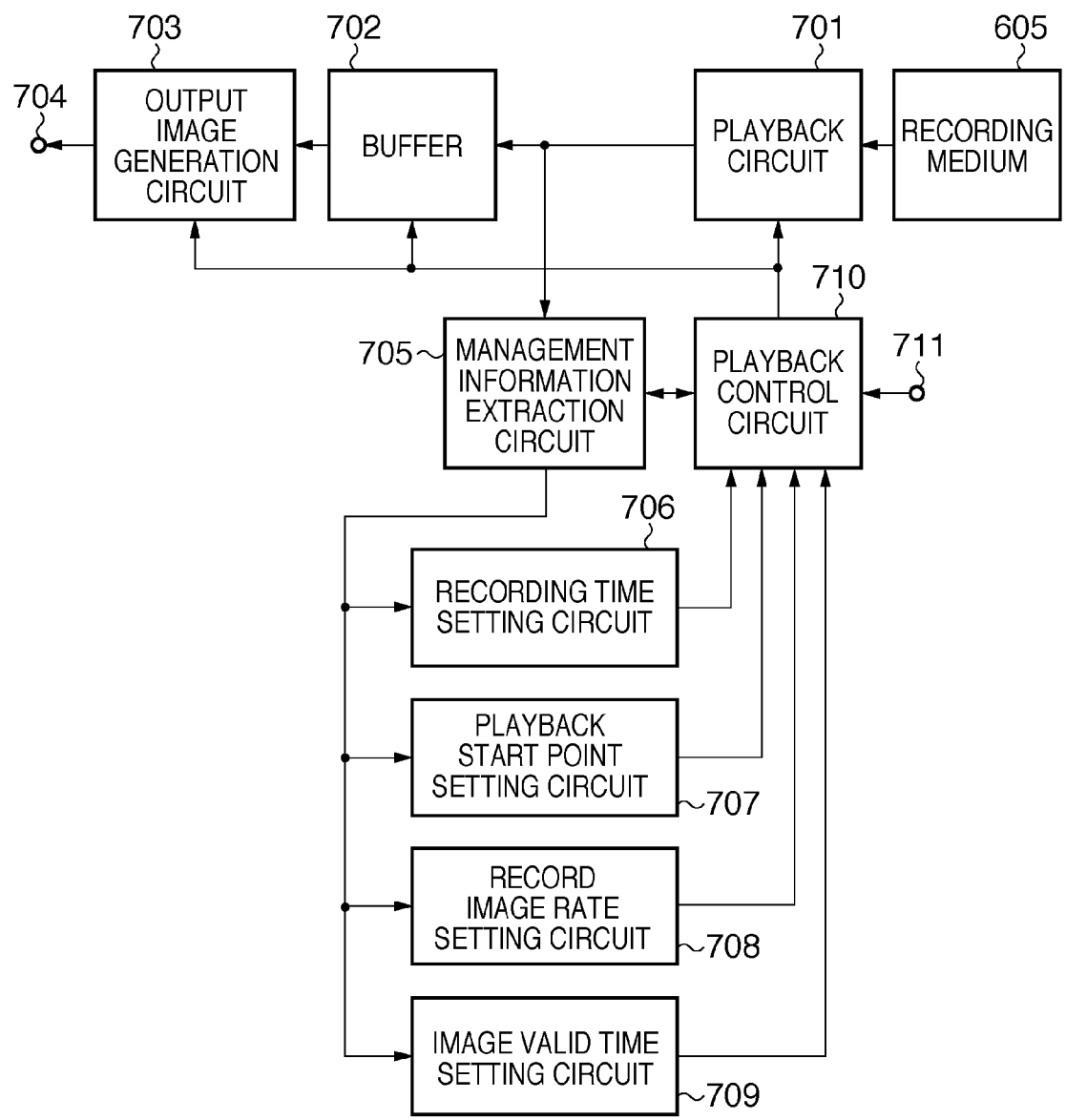
FIG. 9 is a block diagram showing the configuration of the image playback circuit in the image recording playback apparatus.

Next, playback of still image data recorded on the recording medium 605 will be described. FIG. 9 is a block diagram showing the configuration of the image playback circuit in the image recording playback apparatus. The image playback circuit has a playback circuit 701, a buffer 702, an output image generation circuit 703, an output terminal 704 and a management information extraction circuit 705. Further, the image playback circuit has a recording time setting circuit 706, a playback start point setting circuit 707, a record image rate setting circuit 708, an image valid time setting circuit 709, a playback control circuit 710 and an input terminal 711.

Note that as described above, the recording medium 605 holds image data and management information data. The playback circuit 701 plays back the image data recorded on the recording medium 605. The buffer 702 temporarily holds (buffers) the image data played back by the playback circuit 701.

The output image generation circuit 703 composes the image data output from the buffer 702 as output image data. The image data is output from the output terminal 704. The management information extraction circuit 705 extracts the management information played back by the playback circuit 701 and stores the extracted information. The recording time setting circuit 706 sets capture time of the image data recorded on the recording medium 605 in accordance with the information from the management information extraction circuit 705.

The playback start point setting circuit 707 sets the capture point. The record image rate setting circuit 708 sets a rate at the time of record (read time). The image valid time setting circuit 709 sets image valid time. The playback control circuit 710 controls the respective blocks such as the playback circuit 701, the buffer 702 and the output image generation circuit 703, in accordance with set parameters, to generate a playback image. The input terminal 711 inputs parameters such as a playback condition to the playback control circuit 710.

Next, a playback operation of the image playback circuit having the above-described configuration will be described. Upon playback, the playback control circuit 710 controls the playback circuit 701, reads the management information data recorded on the recording medium 605, and supplies the read management information data via the playback circuit 701 to the management information extraction circuit 705.

The management information extraction circuit 705 stores the supplied management information data, extracts the read time Dt (1/1200 sec in FIG. 7) recorded during recording, and supplies the extracted read time Dt to the record image rate setting circuit 708. Further, the management information extraction circuit 705 supplies the image valid time Ct (Ct=1/200 sec in FIG. 7) to the image valid time setting circuit 709. Further, the management information extraction circuit 705 supplies the capture time Rt (Rt=1/12 sec in FIG. 7) to the recording time setting circuit 706. Further, the management information extraction circuit 705 supplies the capture point Pt (Pt=1/24 sec in FIG. 8) to the playback start point setting circuit 707.

When the reading of the management information data has been completed, the playback control circuit 710 calculates the number of valid frames Gp in accordance with the following expression (7) based on the management information data stored in the management information extraction circuit 705.

$$Gp=Ct/Dt \quad (7)$$

The playback control circuit 710 continuously reads image data for the number of frames Gp calculated with the expression (7) from the image data at the time point S(1) marked via the playback circuit 701, based on the management information data stored in the management information extraction circuit 705. Then, the playback control circuit 710 supplies the read image data to the buffer 702. That is, the playback control circuit 710 reads the frame image data in the section between "ts0" and "ts1" in FIG. 7, and stores the read frame image data in the buffer 702.

Note that in the present embodiment, the number of valid frames Gp is obtained by calculation in accordance with the expression (7); however, the number of valid frames Gp may be recorded as management information data upon recording and read upon playback. Further, it may be arranged such that the number of frames by the still image capture is calculated in accordance with the following expression (8), from the image data recorded on the recording medium 605, and the recording position at the time point S(0) is obtained from the table for the respective frame image data stored in the management information extraction circuit 705.

$$Cpf=Pt/Dt \quad (8)$$

Figure 10:
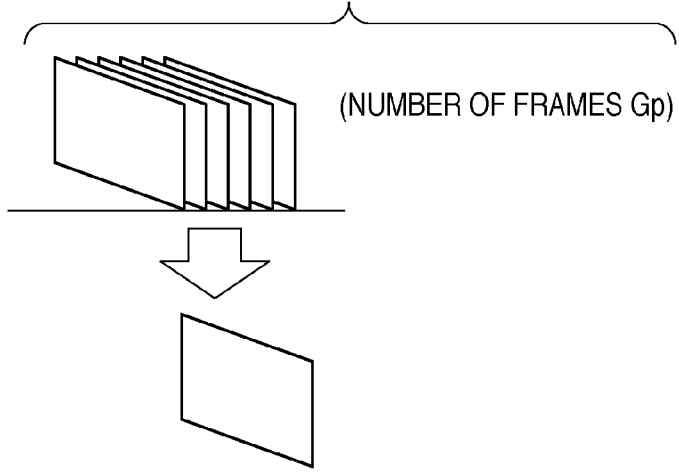
FIG. 10 illustrates generation of one frame image data from frame image data for the number of frames Gp.

The playback control circuit 710 outputs the frame image data for the number of frames Gp stored in the buffer 702 to the output image generation circuit 703. The output image generation circuit 703 generates one frame image data from the frame image data for the number of frames Gp in FIG. 7, and outputs the image data from the output terminal 704. FIG. 10 illustrates generation of one frame image data from the image data for the number of frames Gp. The frame image data is output to a monitor, a printer or the like connected to the output terminal 704. The user can view an output image on the monitor or a printed image.

At this time, when the user thinks that the image is blurred and wants a sharper image, the user issues an instruction from the user interface (not shown) such as a menu, a key or the like. Then, an instruction to change the resolution in the time direction is input from the input terminal 711 into the playback control circuit 710.

Figure 11:
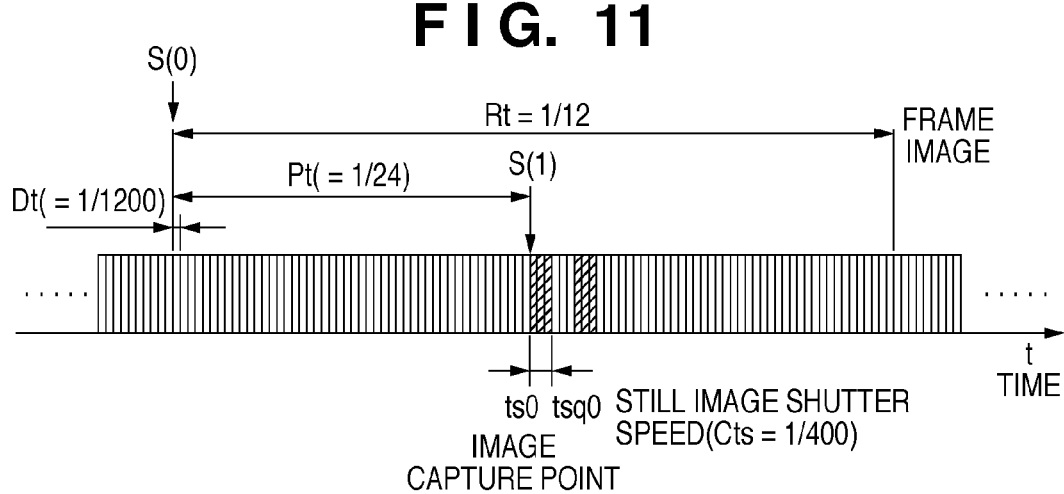
FIG. 11 is a timing chart showing an image data playback operation.

FIG. 11 is a timing chart showing an image data playback operation. When an instruction to increase the resolution in the time direction has been issued, the playback control circuit 710 sets new image valid time Cts in the image valid time setting circuit 709. The new image valid time Cts is set to satisfy the following expression (9). For example, the image valid time Cts is set such that Cts=1/400 sec holds.

$$Cts<Ct \quad (9)$$

The playback control circuit 710 calculates a new number of valid frames Gps in accordance with the following expression (10), based on the image valid time Cts set in the image valid time setting circuit 709 and the record image rate value (image read time Dt) set in the record image rate setting circuit 708. The calculated new number of valid frames Gps satisfies the following expression (11).

$$Gps=Cts/Dt \quad (10)$$

$$Gps<Gp \quad (11)$$

The playback control circuit 710 continuously reads image data for the number of frames Gps calculated with the expression (10) via the playback circuit 701 from the image data at the time point S(1) based on the management information data stored in the management information extraction circuit 705, and supplies the read image data to the buffer 702. That is, the playback control circuit 710 reads frame image data in the section between "ts0" and "tsq0" in FIG. 11, and stores the read image data in the buffer 702.

Figure 12:
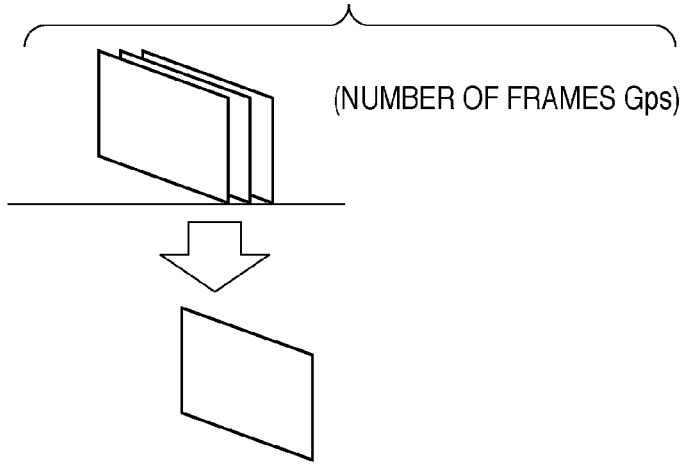
FIG. 12 illustrates generation of one frame image data from frame image data for the number of frames Gps.

The playback control circuit 710 outputs the frame image data for the new number of valid frames Gps stored in the buffer 702 to the output image generation circuit 703. The output image generation circuit 703 generates one frame image data from the frame image data for the number of frames Gps in FIG. 11, and outputs the image data from the output terminal 704. FIG. 12 illustrates generation of one frame image data from image data for the number of frames Gps. The frame image data is output to the monitor, the printer or the like connected to the output terminal 704. The user can view an output image on the monitor or a printed image.

In this manner, when recording still image data, the image recording playback apparatus performs image capture at the high-seed read time Dt, and records image data in periods preceding and subsequent to the still image capture timing (capture point) Pt. Further, the image recording playback apparatus records the timing of still image capture, together with the image valid time Ct upon capturing. Then, upon playback of the still image data, the image recording playback apparatus generates (composes) a playback image from the recorded image data, using frame image data for the image valid time Ct from the timing of recording of the still image.

At this time, when the playback image is blurred, a sharper image can be obtained by performing playback with shortened image valid time Ct. Further, when the playback image is blurred or when scene of the playback image is different from that intended upon capturing, a desired scene can be obtained by generating a playback image with shifted still image capture timing (capture point) Pt.

The image recording playback apparatus in the second embodiment performs image capture at the high speed read time Dt, and records image data in periods precedent and subsequent to the still image capture timing (capture point) Pt. Further, the image recording playback apparatus records the still image capture timing (capture point) Pt together with the image valid time Ct upon capturing. Upon playback, this enables playback at timing intended by the user when recording. Further, playback with changed sharpness and/or capturing timing can be performed.

In this manner, in the case of still image capture, the read time, the image valid time, the recording time and the capture point, with image data continuously read by read time, are recorded on the recording medium. Upon playback, playback at timing intended by the user when recording can be performed. Further, playback with changed sharpness, that is, changed blurring level, can be performed by changing the image valid time. Further, playback with changed capture point can be performed by changing the capturing timing.

That is, when a playback image is blurred, a sharper image can be obtained by performing playback with shortened image valid time. On the other hand, to reduce a noisy feeling in a slow-moving image, it is possible to lengthen the image valid time upon playback. Further, to change the sharpness, a playback image with different sharpness can be obtained by changing the image valid time upon playback. In this manner, it is possible to perform playback with sharpness intended by the user when recording, in addition, even when a playback image is blurred due to insufficient resolution, it is possible to change the sharpness when recording after the capturing and perform playback with the changed sharpness.

Further, frame images preceding and subsequent to the capture point can be recorded as image data. Further, the image data and its management information can be handled as one file. Further, the read time, the image valid time, the recording time and the capture point can be arbitrarily set within a valid range. Further, upon playback, the user's intended still image can be played back by playing back image data recorded in the image valid time. Further, the number of composed frames can be easily controlled. Further, a playback image, recorded with sharpness intended by the user upon capturing, can be obtained without setting operation upon playback. Further, when a playback image is blurred, the sharpness can be easily controlled. Further, when a playback image is blurred or when the scene of the playback image is different from that intended upon capturing, a desired scene can be obtained by generating a playback image with shifted still image capture timing (capture point).

Note that the present invention is not limited to the arrangements in the above-described embodiments, but is applicable to any arrangement as long as the functions shown with the claims of the present invention or the functions of the arrangements in the above-described embodiments are achieved.

For example, in the above-described embodiments, the CCD device is used as the image capture device, however, a CMOS device may be used.

Further, the image recording playback apparatus in the above-described embodiments performs output via the output terminal to a display device such as an external monitor. However, when the image recording playback apparatus includes a display device, the apparatus may perform output to the internal display device. As the display device, an organic EL display, a surface-conduction electron-emitter display (SED), a plasma display and the like, in addition to a liquid crystal display, may be used.

Further, as the image recording playback apparatus, the present invention is applicable to a digital video camera, a digital compact camera, a digital SLR (single lens reflex camera) and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-219586, filed Aug. 28, 2008, which is hereby incorporated by reference herein in its entirety.

What is claimed is:

1. An image processing apparatus comprising:
    a reading unit that reads a plurality of images from recording medium, the plurality of images being captured every first constant time period;
    a composition unit that accumulates images other than some of the plurality of images, and outputs moving image including a plurality of frame images, each of the plurality of frame images being accumulated from a number of images of the plurality of images; and
    a designation unit that designates a second time period to determine a temporal resolution,
    wherein the number of images of the plurality of images being more than one and determined based on the designated second time period and the first constant time period, and
    wherein said second time period relates to one or more image parameters corresponding to a sharpness or a shutter speed of the frame image.

2. The apparatus according to claim 1, wherein the first constant time period is recorded in the recording medium in association with the plurality of images.

3. The apparatus according to claim 1, wherein information for designating the second time period is recorded in the recording medium in association with the plurality of images.

4. The apparatus according to claim 1, further comprising a setting unit that changes the second time period.

5. The apparatus according to claim 1, wherein the composition unit outputs the moving image to a monitor.

6. The apparatus according to claim 1, wherein the composition unit outputs the frame image to a printer.

7. The apparatus according to claim 1, further comprising recording unit that records information designating the first constant time period in association with the captured image in the recording medium.

8. An image processing method comprising the steps of:
    reading a plurality of images from recording medium, the plurality of images being captured every first constant time period;
    accumulating images other than some of the plurality of images, and outputting moving image including a plurality of frame images, each of the plurality of frame images being accumulated from a number of images of the plurality of images; and
    designating a second time period to determine a temporal resolution,
    wherein the number of images of the plurality of images being more than one and determined based on the designated second time period and the first constant time period, and wherein said second time period relates to one or more image parameters corresponding to a sharpness or a shutter speed of the frame image.

9. The method according to claim 8, wherein the first constant time period is recorded in the recording medium in association with the plurality of images.

10. The method according to claim 8, wherein information for designating the second time period is recorded in the recording medium in association with the plurality of images.

11. The method according to claim 8, further comprising the step of changing the second time period.

12. The method according to claim 8, wherein the accumulating step outputs the moving image to a monitor.

13. The method according to claim 8, wherein the accumulating step outputs the composited frame image to a printer.

14. The method according to claim 8, further comprising the step of recording information designating the first constant time period in association with the captured image in the recording medium.

\* \* \* \* \*